(12) United States Patent
Huang et al.

(10) Patent No.: US 10,128,923 B2
(45) Date of Patent: Nov. 13, 2018

(54) METHOD AND DEVICE FOR CONFIGURING WAVEFORM AT TRANSMITTER

(71) Applicant: SPREADTRUM COMMUNICATIONS (SHANGHAI) CO., LTD., Zhangjiang, Shanghai (CN)

(72) Inventors: Su Huang, Shanghai (CN); Jinhui Chen, Shanghai (CN); Zhengang Pan, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 53 days.

(21) Appl. No.: 15/400,220

(22) Filed: Jan. 6, 2017

(65) Prior Publication Data
US 2017/0338871 A1    Nov. 23, 2017

(30) Foreign Application Priority Data

May 20, 2016    (CN) .......................... 2016 1 0339015

(51) Int. Cl.
| | |
|---|---|
| H04L 5/12 | (2006.01) |
| H04J 1/10 | (2006.01) |
| H04B 7/06 | (2006.01) |
| H04L 27/26 | (2006.01) |
| H04B 1/48 | (2006.01) |

(52) U.S. Cl.
CPC ................. *H04B 7/06* (2013.01); *H04B 1/48* (2013.01); *H04L 27/2607* (2013.01); *H04L 27/2628* (2013.01)

(58) Field of Classification Search
CPC ...... H04B 7/06; H04B 7/0413; H04B 7/0456; H04B 7/04; H04B 7/024; H04B 7/0639; H04B 1/48; H04B 7/0452; H04B 1/04; H04B 7/0608; H04B 1/02; H04B 1/0483; H04B 1/16; H04B 1/40
USPC .......................................... 375/265; 370/492
See application file for complete search history.

(56) References Cited

U.S. PATENT DOCUMENTS

| | | | |
|---|---|---|---|
| 2014/0016549 A1* | 1/2014 | Novlan | H04B 7/0417 370/328 |
| 2014/0099116 A1* | 4/2014 | Bai | H04B 10/532 398/76 |

* cited by examiner

*Primary Examiner* — Sam K Ahn
*Assistant Examiner* — Sarah Hassan
(74) *Attorney, Agent, or Firm* — Cantor Colburn LLP

(57) ABSTRACT

Method and device for configuring a waveform at a transmitter are provided. The method includes: receiving at least one input signal, each input signal corresponding to a subcarrier spacing setting; performing IDFT pre-processing to each input signal, the IDFT pre-processing including DFT pre-coding or offset modulation; performing IDFT to each input signal which is subjected to the IDFT pre-processing, the IDFT including an IDFT with parameters including resource mapping and a corresponding IDFT size; performing IDFT post-processing to each input signal which is subjected to the IDFT to obtain at least one output signal, the IDFT post-processing including cyclic extension and time-domain windowing; adding the at least one output signal in time domain; and transmitting the added signal through a corresponding antenna port. Waveforms are configured flexibly according to practical scenarios at the transmitter to determine a most suitable waveform for current scenario, which meets practical requirements of 5G technology.

10 Claims, 3 Drawing Sheets

METHOD AND DEVICE FOR CONFIGURING WAVEFORM AT TRANSMITTER

CROSS-REFERENCE TO RELATED APPLICATIONS

The present application claims priority to Chinese patent application No. 201610339015.X, filed on May 20, 2016, and entitled "METHOD AND DEVICE FOR CONFIGURING WAVEFORM AT TRANSMITTER", and the entire disclosure of which is incorporated herein by reference.

TECHNICAL FIELD

The present disclosure generally relates to wireless communication technology, and more particularly, to a method and a device for configuring a waveform at a transmitter.

BACKGROUND

A wireless communication system consists of a transmitter, a receiver and a transmission medium. Generally, information and data are transmitted between the transmitter and the receiver through wireless electromagnetic waves. In wireless communication, at the transmitter, information to be transmitted is converted into electric signals which are then converted into high-frequency electric oscillation with relatively high strength, and finally the high-frequency electric oscillation is converted into electromagnetic waves to be radiated through an antenna. At the receiver, the radiated electromagnetic waves received through the antenna are converted into high-frequency electric oscillation which is then converted into electric signals, and the electric signals are converted into the information transmitted by the transmitter finally.

At present, in existing Long Term Evolution (LTE) systems, a downlink waveform is fixed to an Inverse Discrete Fourier Transform (IDFT)-based multicarrier Cyclic Prefix-Orthogonal Frequency Division Multiplexing (CP-OFDM), and an upstream waveform is fixed to Single-Carrier Frequency-Division Multiple Access (SC-FDMA) formed by adding Discrete Fourier Transform (DFT) before IDFT.

Inventors have found that at least the following technical problems exist in the existing techniques.

The existing wireless communication systems can only use a fixed waveform for wireless transmission, and cannot choose the most suitable waveform for the current scene. However, in 5G technology (i.e., fifth generation mobile communication technology), new waveforms at NR (New Radio) need to use different waveform configurations in different scenarios. Therefore, the existing waveform configuration methods cannot meet practical requirements of 5G technology.

SUMMARY

In embodiments of the present disclosure, a method and a device for configuring a waveform at a transmitter are provided. Waveforms can be configured flexibly according to practical scenarios at the transmitter, to determine a most suitable waveform for a current scenario, which may meet the practical requirements of the 5G technology.

In an embodiment of the present disclosure, a method for configuring a waveform at a transmitter is provided, including: receiving at least one input signal, each input signal corresponding to a subcarrier spacing setting; performing IDFT pre-processing to each input signal, the IDFT pre-processing including DFT pre-coding and/or offset modulation; performing IDFT to each input signal which is subjected to the IDFT pre-processing, the IDFT including an IDFT with parameters including resource mapping and a corresponding IDFT size; performing IDFT post-processing to each input signal which is subjected to the IDFT to obtain at least one output signal, the IDFT post-processing including cyclic extension and time-domain windowing; adding the at least one output signal in time domain; and transmitting the added at least one output signal through a corresponding antenna port.

Optionally, performing IDFT pre-processing to each input signal may include: not performing any processing to each input signal.

Optionally, prior to performing the IDFT with parameters including resource mapping and a corresponding IDFT size to each input signal which is subjected to the IDFT pre-processing, the method may further include: performing Multiple-Input Multiple-Output (MIMO) pre-coding to each input signal which is subjected to the IDFT pre-processing.

Optionally, performing IDFT post-processing to each input signal which is subjected to the IDFT may include: not performing any processing to each input signal which is subjected to the IDFT.

Optionally, following performing the cyclic extension and time-domain windowing to each input signal which is subjected to the IDFT, the method may further include: performing time-domain bandpass filtering to each input signal which is subjected to the cyclic extension and time-domain windowing.

In an embodiment of the present disclosure, a device for configuring a waveform at a transmitter is provided, including: a receiving circuitry, configured to receive at least one input signal, each input signal corresponding to a subcarrier spacing setting; an IDFT pre-processing circuitry, configured to perform IDFT pre-processing to each input signal, the IDFT pre-processing including DFT pre-coding or offset modulation; an IDFT circuitry, configured to perform IDFT to each input signal which is subjected to the IDFT pre-processing, the IDFT including an IDFT with parameters including resource mapping and a corresponding IDFT size; an IDFT post-processing circuitry, configured to perform IDFT post-processing to each input signal which is subjected to the IDFT to obtain at least one output signal, the IDFT post-processing including cyclic extension and time-domain windowing; and a transmitting circuitry, configured to: add the at least one output signal in time domain, and transmit the added at least one output signal through a corresponding antenna port.

Optionally, the IDFT pre-processing circuitry may be further configured to not perform any processing to each input signal.

Optionally, the IDFT circuitry may be further configured to: prior to performing the IDFT with parameters including resource mapping and a corresponding IDFT size to each input signal which is subjected to the IDFT pre-processing, perform MIMO pre-coding to each input signal which is subjected to the IDFT pre-processing.

Optionally, the IDFT post-processing circuitry may be further configured to not perform any processing to each input signal which is subjected to the IDFT.

Optionally, the IDFT post-processing circuitry may be further configured to: following performing the cyclic extension and time-domain windowing to each input signal which is subjected to the IDFT, perform time-domain bandpass filtering to each input signal which is subjected to the cyclic extension and time-domain windowing.

In the method and device for configuring a waveform at a transmitter that are provided in embodiments of the present disclosure, the IDFT pre-processing including DFT pre-coding and/or offset modulation is performed to each received input signal which corresponds to a subcarrier spacing setting, the IDFT with parameters including resource mapping and a corresponding IDFT size is performed to each input signal which has been subjected to the IDFT pre-processing, and the IDFT post-processing including cyclic extension and time-domain windowing is performed to each input signal which has been subjected to the IDFT, to obtain at least one output signal, where the number of the at least one output signal is equal to the number of the at least one input signal. Finally, the at least one output signal is added in time domain and then transmitted through a corresponding antenna port. Compared with the existing techniques, in the embodiments of the present disclosure, different processing may be selected at the IDFT pre-processing, and different processing may be selected at the IDFT post-processing. Accordingly, different combinations of the selected processing may generate different waveforms. In this way, waveforms can be configured flexibly according to practical scenarios at the transmitter, to determine a most suitable waveform for a current scenario, which may meet the practical requirements of the 5G technology.

DETAILED DESCRIPTION

In order to clarify the object, solutions and advantages of embodiments of the present disclosure, embodiments of present disclosure will be described clearly in detail in conjunction with accompanying drawings. The embodiments below are only described for example, and there are many other possible embodiments. Based on the embodiments below, all the other embodiments obtained by those skilled in the art without any creative efforts should belong to the scope of the present disclosure.

Hereinafter, Pre-IDFT is used to represent IDFT pre-processing, Post-IDFT is used to represent IDFT post-processing. In some embodiments, the Pre-IDFT corresponds to transmitter pre-coding in 3GPP.

Figure 1:
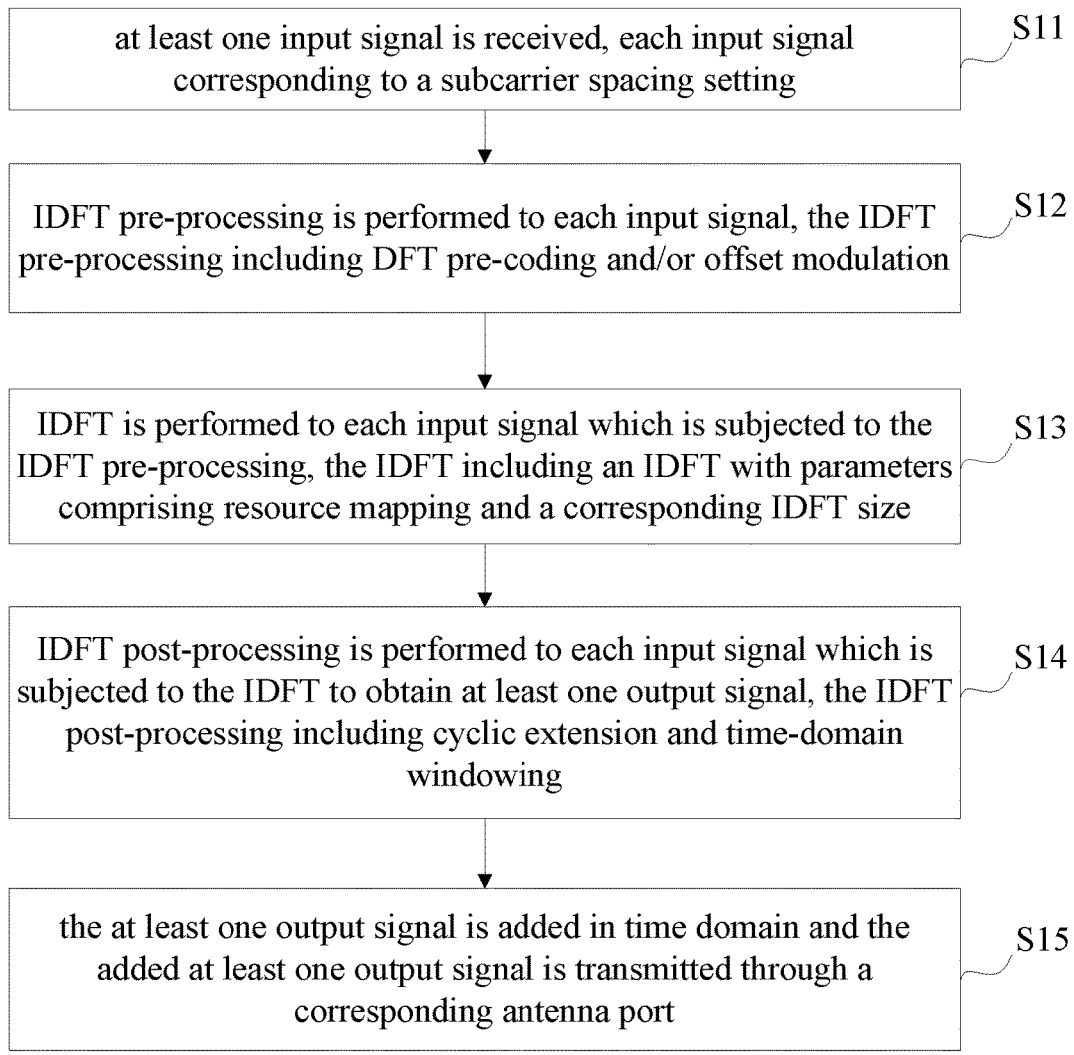
FIG. 1 schematically illustrates a flow chart of a method for configuring a waveform at a transmitter according to an embodiment.

In an embodiment, a method for configuring a waveform at a transmitter is provided. Referring to FIG. 1, the method may include S11, S12, S13, S14 and S15.

In S11, at least one input signal is received, each input signal corresponding to a subcarrier spacing setting.

In some embodiments, the at least one input signal may be layer data obtained by layer mapping. The subcarrier spacing settings corresponding to the at least one input signal may be the same or different.

In S12, IDFT pre-processing is performed to each input signal, the IDFT pre-processing including DFT pre-coding and/or offset modulation.

Optionally, no processing is performed to each input signal at this step.

In S13, IDFT is performed to each input signal which is subjected to the IDFT pre-processing, the IDFT including an IDFT with parameters including resource mapping and a corresponding IDFT size.

In some embodiments, IDFT may be Inverse Fast Fourier Transform (IFFT).

In some embodiments, prior to performing the IDFT with parameters including resource mapping and a corresponding IDFT size to each input signal which is subjected to the IDFT pre-processing, the method may further include: performing MIMO pre-coding to each input signal which is subjected to the IDFT pre-processing.

In S14, IDFT post-processing is performed to each input signal which is subjected to the IDFT to obtain at least one output signal, the IDFT post-processing including cyclic extension and time-domain windowing.

Optionally, no processing is performed to each input signal which is subjected to the IDFT at this step.

In some embodiments, following performing the cyclic extension and time-domain windowing to each input signal which is subjected to the IDFT, the method may further include: performing time-domain bandpass filtering to each input signal which is subjected to the cyclic extension and time-domain windowing.

In some embodiments, for each signal, data at each antenna port is processed independently, and data at a same antenna port of multiple signals is combined. For example, there are three signals (i.e., three numerologies), and each numerology contains two layers and four antenna ports. Initially, it is a structure of "2+2+2". After DFT pre-coding and/or offset modulation, it is still the structure of "2+2+2". Afterwards, based on three 2*4 matrices in the MIMO pre-coding processing, the structure changes to "4+4+4". Finally, at the output, first ones in the three signals are combined to be transmitted through the first antenna, second ones in the three signals are combined to be transmitted through the second antenna, third ones in the three signals are combined to be transmitted through the third antenna, and fourth ones in the three signals are combined to be transmitted through the fourth antenna.

In S15, the at least one output signal is added in time domain and the added at least one output signal is transmitted through a corresponding antenna port.

In some embodiments, the number of the corresponding antenna port may be one or more.

In the method for configuring a waveform at a transmitter that is provided in embodiments of the present disclosure, the IDFT pre-processing including DFT pre-coding and/or offset modulation is performed to each received input signal which corresponds to a subcarrier spacing setting, the IDFT with parameters including resource mapping and a corresponding IDFT size is performed to each input signal which has been subjected to the IDFT pre-processing, and the IDFT post-processing including cyclic extension and time-domain windowing is performed to each input signal which has been subjected to the IDFT, to obtain at least one output signal, where the number of the at least one output signal is equal to the number of the at least one input signal. Finally, the at least one output signal is added in time domain and then transmitted through a corresponding antenna port. Compared with the existing techniques, in the embodiments of the present disclosure, different processing may be selected at the IDFT pre-processing, and different processing may be selected at the IDFT post-processing. Accordingly, different combinations of the selected processing may generate different waveforms. In this way, waveforms can be configured flexibly according to practical scenarios at the transmitter, to determine a most suitable waveform for a current scenario, which may meet the practical requirements of the 5G technology.

Figure 2:
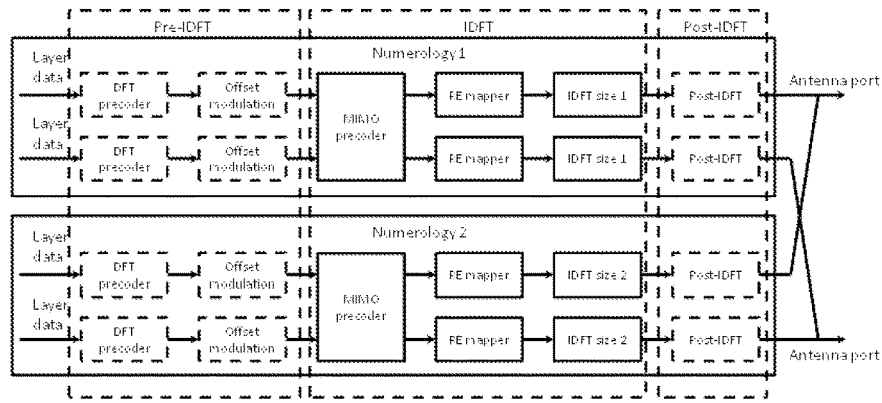
FIG. 2 schematically illustrates a signal transmission diagram of a method for configuring a waveform at a transmitter according to another embodiment.
Figure 3:
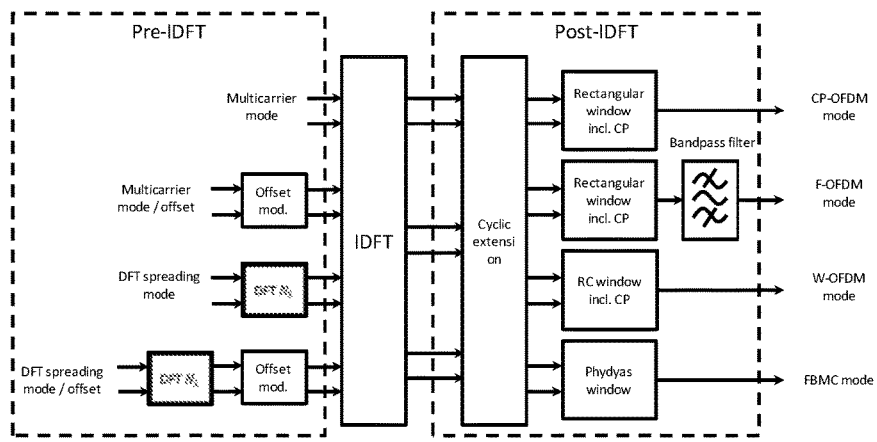
FIG. 3 schematically illustrates a diagram of different configurations in a method for configuring a waveform at a transmitter according to an embodiment.

Hereinafter, a transmitter including two antenna ports is taken as an example. Referring to FIGS. 2 and 3, the transmitter includes a Pre-IDFT circuitry, an IDFT circuitry and a Post-IDFT circuitry. At the input, constellation sequences obtained by layer mapping are provided to the Pre-IDFT circuitry, the IDFT circuitry and the Post-IDFT circuitry successively. Numerologies 1 and 2 correspond to two different subcarrier spacing settings. Each of them goes through the corresponding Pre-IDFT circuitry, IDFT circuitry and Post-IDFT circuitry to be processed, and then they are added in time domain to be transmitted through corresponding antenna ports.

Referring to FIGS. 2 and 3, the Pre-IDFT circuitry includes two optional sub-modules, a DFT pre-coder and an offset modulation sub-module. If none of the two sub-modules is selected, no processing is performed by the Pre-IDFT circuitry, and a conventional multicarrier is obtained. If only the offset modulation sub-module is selected, an offset modulated multicarrier is obtained. If only the DFT pre-coder is selected, a conventional single carrier is obtained, for example, SC-FDMA used for uplink in LTE. If the two sub-modules are selected, a single offset modulated carrier is obtained. In FIG. 3, DFT N1 denotes to DFT pre-coding of an IDFT size of N1, Offset mod. denotes to offset modulation.

Referring to FIG. 2, the IDFT circuitry includes an optional sub-module (MIMO pre-coder) and two mandatory sub-modules including a Resource Element (RE) mapper and an IDFT sub-module (IDFT Size 1 and IDFT Size 2). MIMO pre-coder may employ cyclic delay diversity, codeword based precoding, non-codeword based precoding, space time block coding, space frequency block coding or other methods to perform coding.

Referring to FIG. 3, the Post-IDFT circuitry includes three optional sub-modules, a cyclic extension sub-module, a time-domain windowing sub-module and a bandpass filter. The cyclic extension sub-module copies data output from the IDFT circuitry circularly, length of the copied data depends on length and position of subsequent time-domain windowing. The time-domain windowing sub-module selects data with limited time and multiplies it with a corresponding time-domain weighting coefficient. The bandpass filter performs filtering to the windowed data, to further reduce out-of-band interference.

If the Pre-IDFT circuitry does not perform any processing, and the Post-IDFT circuitry selects cyclic extension and a time-domain rectangular window including a Cyclic Prefix (CP), a waveform of CP-OFDM is realized.

If the Pre-IDFT circuitry selects DFT N1, and the Post-IDFT circuitry selects cyclic extension and a time-domain rectangular window including a CP, a waveform of SC-FDMA is realized.

If the Pre-IDFT circuitry does not perform any processing, and the Post-IDFT circuitry selects cyclic extension, a time-domain rectangular window including a CP and bandpass filtering, a waveform of Filtered OFDM (F-OFDM) is realized.

If the Pre-IDFT circuitry does not perform any processing, and the Post-IDFT circuitry selects cyclic extension and a time-domain non-rectangular window including a CP, a waveform of Windowed OFDM (W-OFDM) is realized.

If the Pre-IDFT circuitry selects offset modulation, and the Post-IDFT circuitry selects cyclic extension and a time-domain window of a PHYDYAS archetype filter, a waveform of Filter Bank Multicarrier with Offset Quadrature Amplitude Modulation (FBMC-OQAM) is realized.

If the Pre-IDFT circuitry selects DFT N1 and offset modulation, and the Post-IDFT circuitry selects cyclic extension and a time-domain window of a PHYDYAS archetype filter, a waveform of Discrete Fourier Transform Spreading Filter Bank Multicarrier with Offset Quadrature Amplitude Modulation (DFT-S-FBMC-OQAM) is realized.

In some embodiments, the Post-IDFT circuitry may not perform any processing, and an output waveform may be a common OFDM waveform.

It should be noted that, what operation the Pre-IDFT circuitry selects is not related to what operation the Post-IDFT circuitry selects. That is, the Pre-IDFT circuitry may select one or two sub-module, or not perform any processing. Similarly, the Post-IDFT circuitry may select the cyclic extension sub-module and the time-domain windowing sub-module, or further select the time-domain bandpass filter, or not perform any processing. The selection result of the Pre-IDFT circuitry may be combined with the selection result of the Post-IDFT circuitry in any forms, to generate a corresponding waveform finally.

Figure 4:
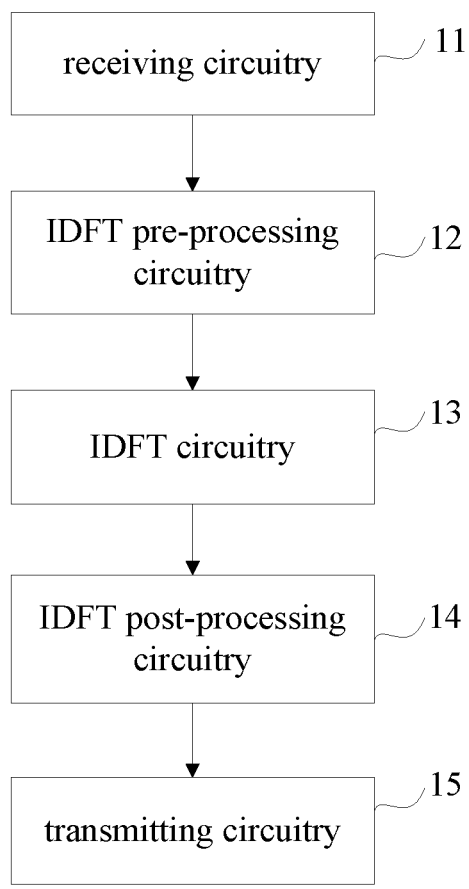
FIG. 4 schematically illustrates a structural diagram of a device for configuring a waveform at a transmitter according to an embodiment.

In an embodiment, a device configuring a waveform at a transmitter is provided. Referring to FIG. 4, the device includes: a receiving circuitry 11, an IDFT pre-processing circuitry 12, an IDFT circuitry 13, an IDFT post-processing circuitry 14, and a transmitting circuitry 15.

The receiving circuitry 11 may be configured to receive at least one input signal, each input signal corresponding to a subcarrier spacing setting.

In some embodiments, the at least one input signal may be layer data obtained by layer mapping. The subcarrier spacing settings corresponding to the at least one input signal may be the same or different.

The IDFT pre-processing circuitry 12 may be configured to perform IDFT pre-processing to each input signal, the IDFT pre-processing including DFT pre-coding and/or offset modulation.

The IDFT circuitry 13 may be configured to perform IDFT to each input signal which is subjected to the IDFT pre-processing, the IDFT including an IDFT with parameters including resource mapping and a corresponding IDFT size.

The IDFT post-processing circuitry 14 may be configured to perform IDFT post-processing to each input signal which is subjected to the IDFT to obtain at least one output signal, the IDFT post-processing including cyclic extension and time-domain windowing.

The transmitting circuitry 15 may be configured to: add the at least one output signal in time domain, and transmit the added at least one output signal through a corresponding antenna port.

In the device for configuring a waveform at a transmitter that is provided in embodiments of the present disclosure, the IDFT pre-processing circuitry performs the IDFT pre-processing including DFT pre-coding and/or offset modulation to each received input signal which corresponds to a subcarrier spacing setting, the IDFT circuitry performs the IDFT with parameters including resource mapping and a corresponding IDFT size to each input signal which has been subjected to the IDFT pre-processing, and the IDFT post-processing circuitry performs the IDFT post-processing including cyclic extension and time-domain windowing to each input signal which has been subjected to the IDFT, to obtain at least one output signal, where the number of the at least one output signal is equal to the number of the at least one input signal. Finally, the transmission circuitry adds the at least one output signal in time domain and then transmits the added signal through a corresponding antenna port. Compared with the existing techniques, in the embodiments of the present disclosure, different processing may be selected at the IDFT pre-processing, and different processing may be selected at the IDFT post-processing. Accordingly, different combinations of the selected processing may generate different waveforms. In this way, waveforms can be configured flexibly according to practical scenarios at the transmitter, to determine a most suitable waveform for a current scenario, which may meet the practical requirements of the 5G technology.

Optionally, the IDFT pre-processing circuitry 12 may be further configured to not perform any processing to each input signal.

Optionally, the IDFT circuitry 13 may be further configured to: prior to performing the IDFT with parameters including resource mapping and a corresponding IDFT size to each input signal which is subjected to the IDFT pre-processing, perform MIMO pre-coding to each input signal which is subjected to the IDFT pre-processing.

Optionally, the IDFT post-processing circuitry 14 may be further configured to not perform any processing to each input signal which is subjected to the IDFT.

Optionally, the IDFT post-processing circuitry 14 may be further configured to: following performing the cyclic extension and time-domain windowing to each input signal which is subjected to the IDFT, perform time-domain bandpass filtering to each input signal which is subjected to the cyclic extension and time-domain windowing.

Those skilled in the art can understand that all of or a portion of the processes in the method provided in the above embodiments can be implemented by related hardware with instruction of computer program. The computer program may be stored in a readable storage medium, and include the processes of the method provided in the above embodiments when it is executed. The readable storage medium may be a magnetic disk, an optical disk, a Read-Only Memory (ROM) or a Random Access Memory (RAM).

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

What is claimed is:

1. A method for configuring a waveform at a transmitter, comprising:
   receiving at least one input signal which corresponds to different subcarrier spacing settings;
   performing Inverse Discrete Fourier Transform (IDFT) pre-processing to each input signal individually, the IDFT pre-processing comprising Discrete Fourier Transform (DFT) pre-coding or offset modulation;
   performing IDFT to each input signal which is subjected to the IDFT pre-processing individually, the IDFT comprising an IDFT with parameters comprising resource mapping and a corresponding IDFT size;
   performing IDFT post-processing to each input signal which is subjected to the IDFT individually to obtain at least one output signal, the IDFT post-processing comprising cyclic extension and time-domain windowing;
   adding the at least one output signal in time domain; and
   transmitting the added at least one output signal through a corresponding antenna port.

2. The method according to claim 1, wherein performing IDFT pre-processing to each input signal individually comprises: not performing any processing to each input signal.

3. The method according to claim 2, wherein prior to performing the IDFT with parameters comprising resource mapping and a corresponding IDFT size to each input signal which is subjected to the IDFT pre-processing individually, the method further comprises: performing Multiple-Input Multiple-Output (MIMO) pre-coding to each input signal which is subjected to the IDFT pre-processing individually.

4. The method according to claim 3, wherein performing IDFT post-processing to each input signal which is subjected to the IDFT individually comprises: not performing any processing to each input signal which is subjected to the IDFT.

5. The method according to claim 3, wherein following performing the cyclic extension and time-domain windowing to each input signal which is subjected to the IDFT individually, the method further comprises: performing time-domain bandpass filtering to each input signal which is subjected to the cyclic extension and time-domain windowing individually.

6. A device for configuring a waveform at a transmitter, comprising:
   a receiving circuitry, configured to receive at least one input signal, each input signal corresponding to a subcarrier spacing setting;
   an Inverse Discrete Fourier Transform (IDFT) pre-processing circuitry, configured to perform IDFT pre-processing to each input signal individually, the IDFT pre-processing comprising Discrete Fourier Transform (DFT) pre-coding or offset modulation;
   an IDFT circuitry, configured to perform IDFT to each input signal which is subjected to the IDFT pre-processing individually, the IDFT comprising an IDFT with parameters comprising resource mapping and a corresponding IDFT size;
   an IDFT post-processing circuitry, configured to perform IDFT post-processing to each input signal which is subjected to the IDFT individually to obtain at least one output signal, the IDFT post-processing comprising cyclic extension and time-domain windowing; and
   a transmitting circuitry, configured to: add the at least one output signal in time domain, and transmit the added at least one output signal through a corresponding antenna port.

7. The device according to claim 6, wherein the IDFT pre-processing circuitry is further configured to not perform any processing to each input signal.

8. The device according to claim 7, wherein the IDFT circuitry is further configured to: prior to performing the IDFT with parameters comprising resource mapping and a corresponding IDFT size to each input signal which is subjected to the IDFT pre-processing individually, perform Multiple-Input Multiple-Output (MIMO) pre-coding to each input signal which is subjected to the IDFT pre-processing individually.

9. The device according to claim 8, wherein the IDFT post-processing circuitry is further configured to not perform any processing to each input signal which is subjected to the IDFT.

10. The device according to claim 8, wherein the IDFT post-processing circuitry is further configured to: following performing the cyclic extension and time-domain windowing to each input signal which is subjected to the IDFT individually, perform time-domain bandpass filtering to each input signal which is subjected to the cyclic extension and time-domain windowing individually.

\* \* \* \* \*